United States Patent [19]

Bürger

[11] Patent Number: 5,158,196
[45] Date of Patent: Oct. 27, 1992

[54] BLANKING PLUG

[75] Inventor: Friedhelm Bürger, Heiligenhaus, Fed. Rep. of Germany

[73] Assignee: Berger & Partner GmbH, Filderstadt, Fed. Rep. of Germany

[21] Appl. No.: 579,076

[22] Filed: Sep. 6, 1990

[30] Foreign Application Priority Data

Sep. 23, 1989 [DE] Fed. Rep. of Germany ....... 3931853

[51] Int. Cl.$^5$ ............................................. B65D 39/00
[52] U.S. Cl. .................................... 215/364; 215/227; 215/261; 215/308; 215/330; 215/357; 220/254; 220/289; 220/371
[58] Field of Search ............... 215/355, 356, 357, 364, 215/227, 261, 308, 329, 330; 220/289, 254, 371, 373, 288

[56] References Cited

U.S. PATENT DOCUMENTS

| 104,794 | 6/1870 | Thompson | 215/364 |
|---|---|---|---|
| 581,765 | 5/1897 | Phillips | 215/364 X |
| 771,298 | 10/1904 | DeClairmont | 215/364 |
| 1,411,179 | 3/1922 | Pavlica | 215/355 X |
| 2,317,882 | 4/1943 | Boesel | 215/227 X |
| 2,362,796 | 11/1944 | Boesel | 215/227 X |
| 3,033,408 | 5/1962 | Joud | 215/364 X |
| 3,255,743 | 6/1966 | Kolbe et al. | 220/371 X |
| 4,146,277 | 3/1979 | Santoro | 215/227 X |
| 4,182,458 | 1/1980 | Meckler | 215/307 |
| 4,545,492 | 10/1985 | Firestone | 215/227 |
| 4,745,073 | 5/1988 | Forrest et al. | 215/227 X |
| 4,809,870 | 3/1989 | Goodall | 220/288 |
| 4,834,234 | 5/1989 | Sacherer et al. | 215/227 X |
| 4,899,897 | 2/1990 | Buttiker et al. | 215/228 |
| 4,925,060 | 5/1990 | Gustafson | 215/364 X |
| 4,958,743 | 9/1990 | Hatton et al. | 220/288 |
| 4,979,368 | 12/1990 | Stetson | 220/288 X |

FOREIGN PATENT DOCUMENTS

| 3212307 | 4/1982 | Fed. Rep. of Germany. | |
|---|---|---|---|
| 2623477 | 11/1987 | France. | |
| 591155 | 4/1959 | Italy | 215/227 |
| 1364148 | 5/1964 | Italy | 215/227 |
| 654541 | 6/1951 | United Kingdom | 215/261 |

Primary Examiner—Stephen Marcus
Assistant Examiner—Stephen Cronin
Attorney, Agent, or Firm—Poms, Smith, Lande & Rose

[57] ABSTRACT

A blanking plug is used for sealing provisionally connection openings (3) of non-installed liquid-operated units, in particular of oil-hydraulic systems (1) for motor vehicles. A section (12) of the blanking plug (10) is inserted into, and fills up, the connection opening (3). The section (12) is provided with a hollow space communicating with a closed portion of the connection opening (3). The hollow space is filled with a material tending to absorb the respective liquid, for example a tampon (17).

13 Claims, 1 Drawing Sheet

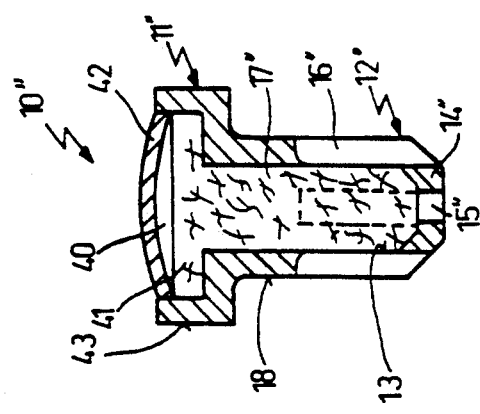
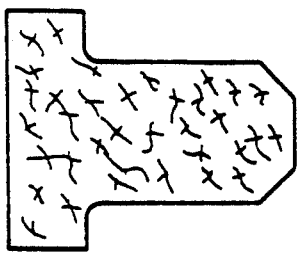
FIG.3
FIG.4
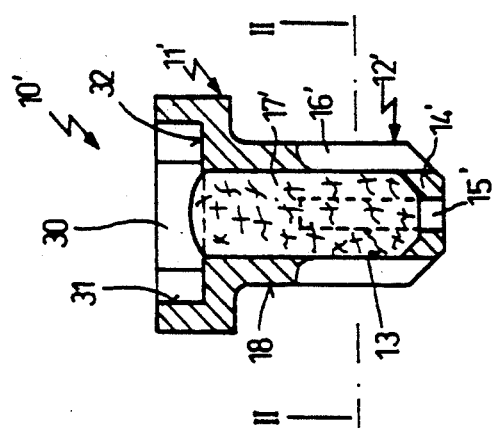
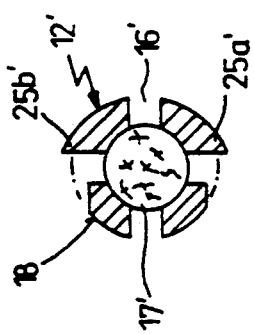
FIG.2A
FIG.2B
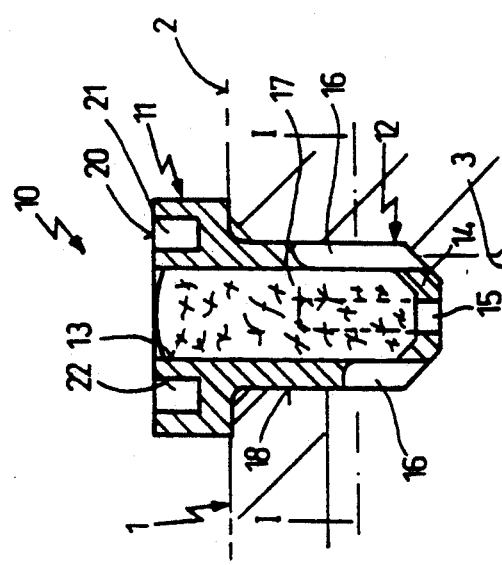
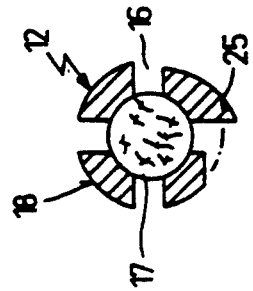
FIG.1A
FIG.1B

BLANKING PLUG

The present invention relates to a blanking plug used for sealing provisionally the connection openings of non-installed liquid-operated units, in particular of oil-hydraulic systems for motor vehicles, comprising a section intended for being inserted into, and for filling up, the connection opening.

Blanking plugs of the described type have been previously known.

Liquid-operated units, for example oil-hydraulic systems for motor vehicles, such as brake systems, power steering systems, suspension systems, or the like, are normally made by third-party suppliers producing them for the motor vehicle manufacturer. Before such units are delivered to the motor vehicle manufacturer, they are subjected to a functional test by the supplier. In the case of brake systems, for example, the safety requirements are of critical importance so that these systems are subjected by their manufacturers to stringent acceptance tests prior to being delivered to the motor vehicle manufacturer. For the purposes of these tests, the system is connected to a pressure oil line, and certain operating conditions of the system are simulated on a test bench.

At the end of these testing procedures, the system is still filled with hydraulic oil which now has to be drained from the system. Considering, however, that the system comprises a plurality of oil pipes which cannot be drained so easily, one closes the exposed connection openings by means of blanking plugs of the type described before, usually plastic screws, so as to prevent any residual oil that may still be contained in the system from leaking out during transportation of the system.

During installation at the motor vehicle manufacturer's factory, the screwing plugs are then removed, and the system is installed in the motor vehicle and connected to the respective lines, for example to the brake lines.

However, as there is still some residual oil present in the system, as has been mentioned before, and as this can never be avoided, due to the numerous oil ducts and capillary tubes, there is always the risk that when connecting the system by screwing the brake lines to the connection openings some of the residual oil may be spilled and may run along the brake line.

During the subsequent checks performed by the motor vehicle manufacturer for the purpose of verifying, for example, the tightness of the brake lines, it is now no longer possible, if traces of oil are present on the brake line, to ascertain in a simple manner, by visual inspection, whether or not a given brake line has been connected correctly, i.e. tightly, because the visible traces of oil may have their origin either in an incorrect connection or in the before-mentioned residual oil having run along the brake line, although the latter has been connected in a perfectly correct way.

Now, it is the object of the present invention to improve a blanking plug of the type mentioned at the outset in such a way that any residual oil contained in the units will be prevented from running out when the blanking plugs are removed for installation of the unit.

This object is achieved according to the invention by the fact that the section is provided with an area communicating with a closed portion of the connection opening and that the area is filled with a material tending to absorb the respective liquid.

This solves the object underlying the invention fully and perfectly. For, if residual liquid remains in the unit and the latter is moved during transportation in such a way that the liquid runs towards the connection opening, the residues will not collect before the blanking plug, as in the case of the prior art, so as to run out when the screw is screwed off, but will enter the area of the blanking plug where they will be absorbed and retained by the absorbent material with the result that no oil residues will run out when the blanking plug according to the invention is removed.

According to a first embodiment of the invention, the blanking plug consists wholly of an absorbent material.

This feature provides the advantage that the absorption volume for the oil residues is particularly important.

According to another group of embodiments of the invention, in contrast, the area is designed as a hollow space.

This feature provides the advantage that the blanking plug can be designed as a mechanically stable unit where the hollow space is enclosed by a hard material whose outer surfaces can be gripped by a tool, for example an automatic tool.

According to a preferred variant of this embodiment of the invention, the hollow space takes the form of a longitudinal bore which is filled up by a cylindrical tampon.

This feature offers the advantage that both the production of the cavity and the filling of the cavity with an absorbent material can be realized in a simple manner, and this the more as commercially available cylindrical tampons can be used.

According to another preferred embodiment of the invention, the hollow space communicates with the connection opening via an opening provided in the end face of the section.

This feature offers the advantage that an opening permitting the liquid to enter the hollow space is provided at the very point where oil residues run up against the end face of the blanking plug.

Alternatively, or as an additional feature, it may be provided according to the invention that the hollow space communicates with the connection opening via at least one axial slot in the section.

This feature provides the advantage that any residual oil present at the periphery of the blanking plug is also permitted to enter the hollow space.

According to a preferred improvement of this variant, the blanking plug is designed as a blanking screw in such a way that the axial slot is provided only in a portion of that section which projects freely into a widening hollow space, beyond the thread in the connection opening.

This feature provides the advantage that any liquid penetrating through the axial slot cannot get into the area of the thread from where it might run out during disconnection of the blanking plug and during the subsequent connection of the respective connection elements of the brake line.

According to a particularly preferred variant, the blanking plug is designed in the form of a machine screw.

This feature provides the advantage that a large number of blanking plugs according to the invention can be mounted on a production line in a short time and with the aid of usual assembly means.

A variant of this embodiment according to the invention provides that the head of the screw is equipped with an annular groove, and the latter is provided with a polygonal surface.

This feature provides the advantage that the blanking plug can be handled easily using a wrench with polygonal head. In addition, it is an advantage of this variant that the hollow space can extend right into the head of the screw so that a particularly large reservoir is available for the absorbent material.

According to another variant of the invention, the head of the screw is provided with a recess, and the latter exhibits a polygonal inner surface.

This feature has the advantage to provide a particularly large polygonal surface which can be gripped by solid tools with outer polygonal surfaces.

According to still another variant, the head of the screw is provided with a recess and the absorbent material fills up at least part of the recess.

This feature provides the advantage that a particularly big volume is available in the hollow space whereby the liquid-absorbing capacity is still further increased.

According to other embodiments of the invention, the hollow space can be closed to the outside.

This feature provides the advantage that the liquid accumulated in the absorbent material cannot be released unwontedly during removal of the blanking plug, for example by compressing the absorbent material. This cannot happen because the hollow space is closed to the outside in this embodiment of the invention.

A preferred further improvement of this variant provides that the closure is designed as a removable cap.

This feature facilitates in an advantageous manner the insertion of the absorbent material into the blanking plug and makes in possible in certain cases to utilize the blanking plug once more, by removing the wet absorbent material after removal of the cap, cleaning the plug and filling it again with fresh absorbent material.

According to other preferred embodiments of the invention, the section performing the function of a screw barrel is provided with a radial raised portion in at least one position of its circumference.

This feature provides the advantage than when the blanking plug is screwed in, those liquid residues which are still retained between the turns of the thread of the connection opening, are stripped off, the turns of the tread being filled up completely by the described radially raised portion.

According to a particularly advantageous feature of this variant, the radially thicker portion extends axially beside and parallel to the axial slot.

This feature provides the advantage that the liquid residues urged out from between the turns of the thread by the axially projecting radially thicker portion can enter the area of the absorbent material directly through the axial slot.

An additional advantageous arrangement provides that two radially thicker portions are arranged on different sides of an axial slot, viewed in the circumferential direction of the section.

This feature provides the advantage that the before-described stripping effect occurs both during screwing-in and during screwing-off the blanking plug.

Preferably, the blanking plug according to the invention is made from a thermoplastic material. According to a further preferred feature, the absorbent material is a paper.

Finally, the invention can be used with particular advantage for sealing connection openings of hydraulic brake systems during transportation between the test bench of the manufacturer of the units and the assembly system of a user thereof.

Other advantages of the invention will appear from the specification and the attached drawing.

It is understood that the features that have been described before and will be explained hereafter may be used not only in the described combinations, but also in any other combination, or individually, without leaving the scope and intent of the present invention.

Certain embodiments of the invention will now be described in more detail with reference to the drawing in which:

FIG. 1A shows a sectional side view of two variants of one embodiment of a blanking plug according to the invention;

FIG. 1B shows a view in the direction of line I—I in FIG. 1;

FIGS. 2A and 2B show views similar to those of FIGS. 1A and 1B, but for another embodiment of the invention;

FIG. 3 shows another view similar to that of FIG. 1A, for still another embodiment of the invention; and FIG. 4 shows a side view of another embodiment of a blanking plug consisting wholly of an absorbent material.

Referring now to FIG. 1, reference numeral 1 indicates, in a very diagrammatic way, a brake system as an example of a liquid-operated unit of the kind of interest for the purposes of the present invention. A connection opening 3, which can be seen best in the right half of FIG. 1A, leads from an outer surface 2 of the brake system 1 via channels of larger and smaller cross-sections to liquid-operated or liquid-operating components inside the brake system 1.

During operation, but also during a possible test run of the brake system 1, a pressure oil line, for example a brake line, is connected to the connection opening 3.

In order to close the connection opening 3 for transportation of the brake system 1 from its manufacturer to a motor vehicle manufacturer, a blanking plug 10 has been screwed into the connection opening 3. The blanking plug 10 is designed in the form of a machine screw and intended to prevent any oil residues that may still be present in the brake system 1 from escaping through the connection opening 3.

The blanking plug 10 comprises an outer first section 11, in the form of the screw head, and an inner screwed-in second section 12 in the form of the screw barrel.

The sections 11 and 12 are passed by a blind bore 13 extending over the largest part of the cross-section of the second section 12, being closed in downward direction only by thin bottom 14. An axial opening 15 provided in the bottom 14 provides a passage from the interior of the connection opening 3 into the hollow space formed by the bore 13.

Axial slots 16 arranged laterally in the second section 12 and leading to the bore 13 from the outside, serve the same purpose.

The bore 13 is filled up by a tampon 17 of substantially cylindrical shape.

The second section 12 finally is provided with an outer thread in order to permit the plug to be screwed into the wall of the antiblock system 1.

In the case of the variant illustrated in the left half of FIG. 1, the brake system 1 has a relatively thin wall only so that the second section 12 projects freely beyond the wall and into the hollow space which is larger than the connection opening 3.

In this case, the axial slot indicated by 16 should be only so long in the axial direction as to terminate below the area of engagement of the blanking plug 10.

It is ensured in this manner that the liquid can penetrate into the bore 13, but not into the area of the thread 18.

If the blanking plug 10 is used for sealing the connection opening 3 during transportation of the brake system 1 from its manufacturer to a motor vehicle manufacturer, then the oil residues remaining in the brake system may flow up to the connection bore 13 where any vibrations or positional changes of the type typically occurring on transports, may cause them to pass through the axial opening 15 and/or the slot 16 and into the bore 13. The latter being filled by a tampon 17, i.e. a structure consisting of an absorbent material, the liquid residues will be absorbed and stored in the bore 13.

Later, when the blanking plug 10 is screwed off in the factory of the motor vehicle manufacturer, in order to connect the brake lines or other pressure oil lines of the motor vehicle, one does not have to fear that oil residues may leak out of the brake system 1.

The blanking plug 10 as illustrated in FIG. 1A is provided with an annular groove 21 arranged in the head of the machine screw, in its first section 11. The inner wall of the annular groove 21 takes the form of an external hexagon. It is thus possible to grip the blanking plug 10 illustrated in FIG. 1A from above, using a usual internal hexagon head wrench, and to tighten or untighten it in this manner. The bore 13 extends right to the upper face 20, thereby providing a particularly important volume for the accumulation of oil residues.

The cross-sectional view of FIG. 1B shows that one of the segments of the second section 12, which has been left between the slots 16, is provided with a radial projection 25. As the blanking plug 10 is screwed into the connection opening 3, the radial projection 25 applies itself tightly against the inside of the thread turns, thereby stripping off any oil residues still present in these areas in inward direction. The radial projection 25, which can be seen best in FIG. 1B, being arranged beside an axial slot 16 and having a length equal to that of the axial slot 16, the oil is stripped off into the directly adjacent slot and upon the tampon 17 by which it is absorbed immediately.

FIGS. 2A, 2B and 3, which illustrate other embodiments of the invention, use the same reference numerals as FIGS. 1A and 1B, except that a single apostrophe has been added in FIGS. 2A and 2B, and a double apostrophe in FIG. 3.

The embodiment illustrated in FIGS. 2A and 2B differs from that illustrated in FIGS. 1A and 1B mainly insofar as the first section 11' is provided with a recess 30 filling up almost the whole first section 11'. The recess 30 is provided with a hexagon socket 31.

The blanking plug 10', therefore, can be gripped and handled using a relatively thick tool, namely an external hexagon wrench.

Consequently, the bore 13 only extends up to a bottom 32 of the recess 30, and the tampon 17' is also somewhat shorter in the axial direction, as compared with the embodiment illustrated in FIGS. 1A and 1B.

FIG. 2B shows another variant where two of the four segments of the second section 12', that have been left between the slots 16', are provided with radial projections 25a' and 25b', the radial projections 25a' and 25b' being arranged on different sides of the slots 16', viewed in the circumferential direction of the second section 12'. This has the effect that when the blanking plug 10 is screwed on or off, any oil present in the turns of the thread is stripped off directly into the neighboring slot 16'.

In the case of the variant illustrated in FIG. 3, the first section 11" is again provided with a recess 40, similar to that illustrated in and explained with reference to FIG. 2A.

Contrary to the above arrangement, the tampon 12' of the embodiment illustrated in FIG. 3 is provided with a radially thicker head portion 41 filling up part of the recess 40, the recess 40 being closed above the head portion 41 by a closure cap 42.

In order to enable the blanking plug 10" to be handled, the outer circumference of the first section 11" is provided conveniently with an external hexagon 43.

The blanking plug 10" of FIG. 3, therefore, comprises a tampon 11" of even greater volume which is in addition fully enclosed, also to the outside, the closure cap 42 preventing any fluid from passing to the outside, for example when a user of the blanking plug 10" should press upon the tampon 17" by his fingers, from the upper radial end face.

The closure cap 42 may be removable, in which case the tampon 12" can be removed from the blanking plug 10" as well.

Preferably, the blanking plugs consist of a thermoplastic material, such as a polyamide. As has been mentioned before, the absorbent material preferably takes the form of a tampon 17, although it is also possible to fill the cavity provided for this purpose with a hygroscopic granulated material.

FIG. 4 finally shows another embodiment of a blanking plug 10''' according to the invention, which is wholly constituted by an absorbent material, such as compressed paper. The blanking plug 10''' has the shape of a machine screw and can be screwed in manually or with the aid of suitable tools.

In addition, it is understood that the blanking plugs according to the invention may have any design, as regards the surfaces intended for being gripped by tools, which means that in addition to being designed as internal or externals hexagons, they may also be provided with a grooved surface or any other surface suitable for being handled by some form-locking means. It is thus possible to process the blanking plugs according to the invention in automatic assembly machines which means that they can be fitted by automated procedures.

I claim:

1. A liquid-operated unit having a connection opening with a throughbore therein, and a blanking plug for provisionally sealing-off said connection opening, said plug comprising:
   a first outer section for gripping and manipulating said plug during installation thereof in said connection opening; and
   a second inner section integral with said first outer section filling up said throughbore, said second inner section having a cavity extending longitudinally and axially therethrough and communicating with said throughbore, said cavity having absorbent means therein substantially filling in said cavity and being of a material capable of absorbing liquid entering said cavity;

wherein said throughbore has a threaded inner surface and said plug is a machine screw having threads mating with said threaded inner surface of said throughbore.

2. The unit of claim 1, wherein said cavity communicates with said throughbore via an opening provided in an end face of said second inner section.

3. The unit of claim 1, wherein said first outer section and said second inner section are made from a thermoplastic material.

4. The unit of claim 1, wherein said absorbent material is paper.

5. The unit of claim 1 being a pre-tested anti-skid brake system for a motor vehicle.

6. A liquid-operated unit having a connection opening with a throughbore therein, and a blanking plug for provisionally sealing-off said connection opening, said plug comprising:

a first outer section for gripping and manipulating said plug during installation thereof in said connection opening; and a second inner section integral with said first outer section filling up said throughbore, said second inner section having a cavity extending longitudinally and axially therethrough and communicating with said throughbore, said cavity having absorbent means therein substantially filling said cavity and being of a material capable of absorbing liquid entering said cavity;

wherein said first outer section is provided with an annular groove, said groove being polygonally shaped in cross-section.

7. A liquid-operated unit having a connection opening with a throughbore therein, and a blanking plug for provisionally sealing-off said connection opening, said plug comprising:

a first outer section for gripping and manipulating said plug during installation thereof in said connection opening; and a second inner section integral with said first outer section filling up said throughbore, said second inner section having a cavity extending longitudinally and axially therethrough and communicating with said throughbore, said cavity having absorbent means therein substantially filling said cavity and being of a material capable of absorbing liquid entering said cavity;

wherein said first outer section is provided with a recess, said recess being polygonally shaped in cross-section.

8. A liquid-operated unit having a connection opening with a throughbore therein, and a blanking plug for provisionally sealing-off said connection opening, said plug comprising:

a first outer section for gripping and manipulating said plug during installation thereof in said connection opening; and a second inner section integral with said first outer section filling up said throughbore, said second inner section having a cavity extending longitudinally and axially therethrough and communicating with said throughbore, said cavity having absorbent means therein substantially filling said cavity and being of a material capable of absorbing liquid entering said cavity;

wherein said first outer section is provided with a recess, said absorbent means extending into said recess.

9. A liquid-operated unit having a connection opening with a throughbore therein, and a blanking plug for provisionally sealing-off said connection opening, said plug comprising:

a first outer section for gripping and manipulating said plug during installation thereof in said connection opening; and a second inner section integral with said first outer section filling up said throughbore, said second inner section having a cavity extending longitudinally and axially therethrough and communicating with said throughbore, said cavity having absorbent means therein substantially filling said cavity and being of a material capable of absorbing liquid entering said cavity;

wherein said first outer section and said second inner section are provided with a common cavity opening into a surface of said first outer section opposite said second inner section, a cap being provided on said first outer section for closing said cavity opening into said surface.

10. A liquid-operated unit having a connection opening with a throughbore therein, and a blanking plug for provisionally sealing-off said connection opening, said plug comprising:

a first outer section for gripping and manipulating said plug during installation thereof in said connection opening; and a second inner section integral with said first outer section filling up said throughbore, said second inner section having a cavity extending longitudinally and axially therethrough and communicating with said throughbore, said cavity having being of a material capable of absorbing liquid entering said cavity;

wherein said throughbore has a threaded inner surface mating with a threaded outer surface on said second inner section, said threaded outer surface being provided with a radial protrusion.

11. The unit of claim 10, wherein said cavity communicates with said throughbore via at least one axial slot in said second inner section, said radial protrusion extending axially beside and parallel to said axial slot.

12. The unit of claim 10, wherein two radial protrusions are arranged on different sides of said axial slot, viewed in a circumferential direction of said second inner section.

13. A blanking plug for provisionally sealing-off a threaded hydraulic connection bore of a non-installed liquid-operated unit, said plug comprising:

a first outer section for gripping and manipulating said plug during installation thereof; and a second inner section integral with said first outer section, said second inner section having a cavity extending longitudinally and axially therethrough and communicating with an opening of said second inner section arranged opposite said first outer section, said cavity having absorbent means therein substantially filling said cavity and being of a material capable of absorbing liquid entering said cavity;

wherein said plug is a machine screw having a recess in said first outer section polygonally shaped in cross-section.

* * * * *